United States Patent
Raikov et al.

(10) Patent No.: US 12,222,680 B1
(45) Date of Patent: Feb. 11, 2025

(54) DEVICE FOR IMAGE RECOGNITION BASED ON FULL-ANALOG PHOTONIC NEURAL NETWORK AND METHOD THEREOF

(71) Applicants: JINAN INSTITUTE OF SUPERCOMPUTING TECHNOLOGY, Shandong (CN); SHANDONG COMPUTER SCIENCE CENTER (NATIONAL SUPERCOMPUTER CENTER IN JINAN), Shandong (CN)

(72) Inventors: Aleksandr Raikov, Shandong (CN); Meng Guo, Shandong (CN); Jingshan Pan, Shandong (CN); Weina Chen, Shandong (CN)

(73) Assignees: JINAN INSTITUTE OF SUPERCOMPUTING TECHNOLOGY, Shandong (CN); SHANDONG COMPUTER SCIENCE CENTER (NATIONAL SUPERCOMPUTER CENTER IN JINAN), Shandong (CN)

( * ) Notice: Subject to any disclaimer, the term of this patent is extended or adjusted under 35 U.S.C. 154(b) by 0 days.

(21) Appl. No.: 18/804,475

(22) Filed: Aug. 14, 2024

(30) Foreign Application Priority Data

Apr. 10, 2024 (CN) .......................... 202410423859.7

(51) Int. Cl.
*G03H 1/22* (2006.01)
*G03H 1/12* (2006.01)
(Continued)

(52) U.S. Cl.
CPC ................. *G03H 1/22* (2013.01); *G03H 1/12* (2013.01); *G06N 3/04* (2013.01); *G06N 3/0464* (2023.01);
(Continued)

(58) Field of Classification Search
None
See application file for complete search history.

(56) References Cited

U.S. PATENT DOCUMENTS

| 5,099,434 A | 3/1992 | Stoll et al. |
| 2021/0258666 A1 * | 8/2021 | Mazed ............... H04Q 11/0005 |

FOREIGN PATENT DOCUMENTS

| CN | 112465137 A | 3/2021 |
| CN | 116235107 A | 6/2023 |

(Continued)

OTHER PUBLICATIONS

Qiuhao Wu el.al, "Multi-layer optical Fourier neural network based on the convolution theorem" AIP Advances 11, 055012 (2021) May 11, 2021.

*Primary Examiner* — Leon Flores
(74) *Attorney, Agent, or Firm* — IPRO, PLLC (57) ABSTRACT

The provided is a device for image based on FAPNN and a recognition method, comprising creating training transparent matrices corresponding to various discrete image categories in the training analog image dataset, recording each image for each image category by a Fourier convolution in one cell of the training transparent holographic matrix; generating different separate holographic cells on the 3D holographic memory matrix by simultaneously Fourier convolution of all images recorded on the training transparent holographic matrix; recording, with mechanical or optical change of the training transparent matrices, various image categories in different holographic cells of the 3D holographic memory matrix at different angles of reference beam (Continued)

and object beam; and receiving the analog image to be recognized, recognizing the image to be recognized and obtaining an image recognition result through values recorded in the holographic cells in the 3D holographic memory matrix.

3 Claims, 3 Drawing Sheets

(51) Int. Cl.
- *G06N 3/04* (2023.01)
- *G06N 3/0464* (2023.01)
- *G06N 3/065* (2023.01)
- *G06N 3/067* (2006.01)
- *G06V 10/44* (2022.01)
- *G06V 10/82* (2022.01)
- *G06V 10/88* (2022.01)

(52) U.S. Cl.
CPC .............. *G06N 3/065* (2023.01); *G06N 3/067* (2013.01); *G06V 10/454* (2022.01); *G06V 10/82* (2022.01); *G06V 10/88* (2022.01)

(56) References Cited

FOREIGN PATENT DOCUMENTS

| | | |
|---|---|---|
| GB | 8624633 | 3/1987 |
| WO | 2022016894 A1 | 1/2022 |

\* cited by examiner

DEVICE FOR IMAGE RECOGNITION BASED ON FULL-ANALOG PHOTONIC NEURAL NETWORK AND METHOD THEREOF

CROSS-REFERENCE TO RELATED APPLICATIONS

The present invention claims priority benefits to Chinese Patent Application number 202410423859.7, entitled "a device for image recognition based on a full-analog photonic neural network and a method thereof," filed on Apr. 10, 2024, with the China National Intellectual Property Administration (CNIPA), the entire contents of which are incorporated herein by reference and made a part of this invention for all purposes.

TECHNICAL FIELD

The present invention belongs to the field of information processing technology and, in particular, relates to a device for image recognition based on a full-analog photonic neural network (FAPNN) and method thereof. Images can represent objects such as pictures, emotions, cars, symbols, texts, gait, plants, function graphs, odor signals, etc.

BACKGROUND OF THE INVENTION

The statements in this section merely provide background art information related to the present invention and do not necessarily constitute the prior art.

A traditional method for image recognition based on full-analog (or, all-analog) optics is to add multiple layers of diffractive optical computing modules to a full-analog optical system and redesign electronic components for parallel output to solve the recognition task by cascading a plurality of optical blocks; simultaneously, continuous data is transformed (encoded) into a discrete (digital, binary) form by using digital semiconductor electronic components, correlation of the polarized beams, and "write-once-read-many" memories; and optical convolution operation is made by optical multiplexing of discrete matrices or by the optical linear transformation of discrete vectors; and a plurality of computing units involved are necessarily connected in single or intergroup communication, and to overcome manufacturing limitations of modern optical neural networks based on matrix multiplication sampling (digitization, encoding) operations with signals are used before photonic computation; and some methods to record many images in a single cell of a holographic memory are existed, such as recording images at different angles of the reference beam, using different wavelengths, changing the phase of the reference beam, using different polarization states of light, using the volume of the holographic material (3D holography), recording some images with short time intervals, using properties of quantum dots; the Fourier image of an object beam represents its spatial frequency components (spectrum), the Fourier image recorded on a hologram is the interference pattern between the object and reference beams and is not directly identical to the Fourier image of an object beam, there may be a scaling difference between them, which depends on the wavelength, the distance between the object and the holographic plate, and the optical system used, the hologram can contain phase information that might not be present in a Fourier image of the object beam. The inventor found that the above solutions have the following defects:

1. Due to the complexity (continuous signal sampling and digitization, many blocks and layers) of the designed neural network structure, the recognition task is required to consider thousands or billions of objects' parameters to be recognized; the number of object recognition, for example, emotions, is limited by the digital semiconductor electronic components and the optical "write-once-read-many" memories, accompanied by spectral distortions of natural continuous signal by its digitization, and such a system construction does not allow a reduction in the physical dimension of the system, and sampling operations are used before photonic computation, also accompanied by the mentioned intrinsic limitations.

2. Existing optical machine learning has comparatively high time and energy costs, and limitations in scaling, because of sampling and parameterization of a natural continuous signal with destroying its spectrum, multi-step training multi-layer neural network; for example, in the application of emotion recognition, there may need to be recognized thousands of emotions (categories of emotions), with a continuous range among different emotions, however, modern optical and digital tools cannot cover a wide and continuous range of emotions.

3. Existing adaptive and multi-step training methods for fine-tuning electronic-analog computation by a full-analog photonic chip have limitations similar to those of digital neural networks, such as high energy and time consumption and sampling continuous signals that distort the signal spectrum; according to fundamental Nyquist-Shannon-Kotelnikov sampling theorem or the universal approximation theorem, to achieve 100% accuracy of the point representation of a mathematical function, the number of samples (parameters for training a neural network) in natural signal representation should tend to infinity, and therefore the training time and energy consuming should tend to infinity.

4. The plurality of computing units involved are necessarily connected in single or intergroup communication, which limits the computing efficiency during neural network training, and the application of optical tools currently cannot overcome this communication limitation; the problem of using time-cost analog-to-digital converters for intergroup communication still exists.

5. Each of the above-mentioned methods of recording many images in a single cell of a holographic memory has limitations on the number of recorded images, depending on the device's construction and photonic material; most are at the experimental research stage.

SUMMARY OF THE INVENTION

To solve technical problems represented in the background, the first aspect of the present invention provides a device for image recognition based on full-analog photonic neural network (FAPNN), which does not require multiple matrix multiplication, multiple setting up the weights of neurons' connections, data and signal sampling. A 3D holographic memory stores all required data on a single board in the form of a Fourier convolution matrix of the image sets, with each matrix cell corresponding to a single images or image categories. Two transparent Fourier convolution matrices are used, one is to store a set of single images or Fourier convolutions of single images in every cell, and the other is to store Fourier convolutions of the set of images of single category of images in every cell.

To achieve the above objectives, the present invention adopts the following technical solutions.

The first aspect of the present invention provides a device for image recognition based on FAPNN, including a first subsystem, a second subsystem, a third subsystem, and an electronic digital controller; wherein the first, the second, and the third subsystems share one laser and include an optical block for Fourier transform with taking into account scaling, rotation, and phase factors; the first and the second subsystems include training transparent holographic matrices for storing training sets of images; the second and the third subsystems include a transparent 3D holographic memory matrix for storing Fourier convolution of the set of images of a single category in every cell; the third subsystem includes optical detectors and an analog camera.

It should be noted that, to compare the Fourier images fully, the scaling, rotation, and phase factors must be considered in the FAPNN when comparing the Fourier image in an object beam to the Fourier image on a hologram.

The electronic digital controller is configured to change an angle of inclination of a reference beam of the laser and an object beam by deflectors, using a beam emitted by the laser and a training image dataset as inputs, control the first subsystem to create training transparent holographic matrices (it can be 3D holographic matrix) corresponding to different discrete image categories in the training image dataset;

using the beam emitted by the laser and an output of the first subsystem as inputs to the second subsystem, control the second subsystem to generate different separate holographic cells on the 3D holographic memory matrix, wherein the holographic cells corresponding to various discrete image categories; with an optical (or mechanical) change in the training transparent holographic matrices, record various images after the Fourier convolutions at different holographic cells of the 3D holographic memory matrix at different angles of the reference beam and the object beam.

The third subsystem is configured to receive an image to be recognized from the analog camera, convert the analog signal into a Fourier convolved signal, expand it, and output the Fourier convolved signal according to the object corresponding to one or some of the categories simultaneously to all cells of the hologram cells recorded in the 3D holographic memory matrix.

Further, a number of the training transparent holographic matrices corresponds to a number of discrete image categories of recorded images, wherein each of the training transparent holographic matrices writes images (or Fourier convolutions of images) from one of the categories of images; and a number of the holographic cells corresponds to the number of the recorded images, wherein the holographic cells in the 3D holographic memory matrix corresponding to various discrete image categories. Different training transparent holographic matrices corresponding to various image categories can be changed mechanically or in optical ways.

Further, the first subsystem includes the laser, a shutter, two translucent reflectors, a reflector, a spatial light modulator, a first beam expander, a second beam expander, a first optical block, the training transparent holographic matrices, and a first deflector; a first end of the spatial light modulator is connected to the shutter through the first beam expander, a second end of the spatial light modulator is connected to the first optical block, a first end of the first deflector is connected to the first optical block, and a second end of the first deflector is connected to the electronic digital controller. A laser matrix can replace the laser and the beam expander.

Further, the controlling the first subsystem to create training transparent holographic matrices corresponding to different discrete image categories in the training image dataset, specifically including:

receiving the object beam and each image in the training image dataset by the spatial light modulator, transforming the object beam emitted by the laser through an optical Fourier convolution operation and the first optical block, and directing the beam to the first deflector to arrive at a next cell in the training transparent holographic matrices from the first deflector; and expanding and directing the reference beam emitted by the laser to the training transparent holographic matrices, and fixing Fourier images in the training transparent holographic matrices in the form of a hologram.

Further, the second subsystem includes the laser, the second beam expander (the laser and the second beam expander can be replaced by the laser matrix), a second optical block, a second deflector, a third deflector, the training transparent holographic matrices, and the 3D holographic memory matrix;

a first end of the second beam expander is connected to the laser, a second end of the second expander is directed to the training transparent holographic matrices and then is directed to the second optical block, the second optical block makes Fourier convolution of many parallel beams from training transparent holographic matrices and by the second deflector directs into one cell of the 3D holographic memory matrix; a first end of the third deflector is directed to the 3D holographic memory matrix and a second end of the third deflector is connected to the laser through the two translucent reflectors, and the second deflector and the third deflector are connected to the electronic digital controller.

Further, the recording of various categories of images at different holographic cells of the 3D holographic memory matrix at different angles of the reference beam and the object beam, including:

directing an expanded object beam emitted by the laser (the laser and the beam expander can be replaced by the laser matrix) to the recorded training transparent holographic matrices and passing it through the second optical block, making a Fourier convolution of the image set modulated in the training transparent holographic matrices occur in the second optical block, focusing the object beam into one cell of the 3D holographic memory matrix; this beam carries information about a plurality of Fourier images recorded in the training transparent holographic matrices, and then deflecting the beam by the second deflector to corresponding cells in the 3D holographic memory matrix, each cell of the present matrix corresponds to a single category of images;

directing the reference beam emitted by the laser through the third deflector to the same cell towards which the object beam pointing as a result of two (if training transparent holographic matrices consists of Fourier images) Fourier transforms, and repeating the same operations as the object beam for another image recorded on another training transparent holographic matrices, until all the training transparent holographic matrices, devoted different categories of images, are stored into different cells of the 3D holographic memory matrix.

Further, the third subsystem includes the laser, a third beam expander (the laser and the third beam expander can be replaced by the laser matrix), a fourth beam expander, the analog camera, an optical block, the 3D holographic memory matrix, a detector matrix, an analog-to-digital converter, and an electronic analog calculator; wherein the detector matrix has an input end connected to the 3D holographic memory matrix and an output end connected to the analog-to-digital converter and the electronic analog calculator, and when the third subsystem performs image recognition, each image in the detector matrix is represented by a fuzzy set of cells with different intensities, and all the cells are displayed by the analog-to-digital converter and under control of computation by the electronic analog calculator.

A second aspect of the present invention provides a method for image recognition based on the FAPNN, using the device for image recognition based on the FAPNN described in the first aspect, including the steps:

acquiring a training analog image dataset;

creating training transparent holographic matrices corresponding to various discrete image categories in the training image dataset, recording each cell for each image in the form of images themselves or their Fourier convolution in the training transparent holographic matrices;

generating different separate holographic cells on the 3D holographic memory matrix, wherein the holographic cells correspond to Fourier images of the various discrete image categories;

recording, with an optical or mechanical change of the training transparent holographic matrices, the various image categories in different holographic cells of the 3D holographic memory matrix at different angles of a reference beam and an object beam; and receiving an analog signal of an image to be recognized, for example, from the analog camera, recognizing the image to be recognized, and obtaining an image recognition result, which can be represented on a fuzzy (continuous) scale through values of the holographic cells recorded in the 3D holographic memory matrix.

Further, the number of the training transparent holographic matrices corresponds to a number of the recorded image categories, wherein each of the training transparent holographic matrices represents one category of images; and the number of the holographic cells in every training transparent holographic matrices corresponds to the number of the recorded images, wherein every holographic cell corresponds to one of the representations of the image categories.

Further, the recording of the various image categories in different holographic cells of the 3D holographic memory matrix at different angles of the reference beam and the object beam and with the optical change in the training transparent holographic matrices is specifically as follows: during the change of the optical matrix, using a rewritable 3D holographic storage device, and recording various images in the storage device in a matrix form according to different angles of the reference beam and the object beam.

Compared with the prior art, the beneficial effects of the present invention are as follows:

1. According to the present invention, current multiple tuning (setting up) steps of weights of connections between multilayer structures of training optoelectronic neural network nodes are replaced by utilizing a single 3D holographic memory board in the form of a matrix with units containing 3D holographic cells, which is the result of a Fourier convolution of an image and an image set, and the possibility of training the 3D holographic memory through only one optical operation is given, so that the limitation of the number of image recognitions is overcome.

2. According to the present invention, the image and the image set are represented by the Fourier convolution transform to replace the traditional sampling (digitizing) of the continuous signals, thereby preserving the full and infinite range of the natural signal spectrum. This ensures that conventional thousands and millions of discrete digital and optical machine learning operations are reduced through only one optical operation, thereby solving the problem of a wide range of continuous images that cannot be overcome in traditional machine learning.

3. According to the present invention, when the image is detected and recognized through many fuzzy values of different images written in the 3D holographic memory matrix these values are automatically mapped to a continuous coordinate system (such as a valence-arousal bipolar coordinate system in the case of emotion recognition), the set of about thousand images which may be faced in the actual practice is recognized through one optical operation without being limited by the multistep training of the neural network.

The advantages of additional aspects of the present invention will be partially given in the following description, some of which will become apparent from the following description or will be learned through the practice of the present invention.

BRIEF DESCRIPTION OF DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION OF THE INVENTION

The present invention is described below in conjunction with the accompanying drawings and embodiments.

It should be noted that the following detailed description is exemplary and is intended to further describe the present invention. Unless otherwise specified, all technical and scientific terms used herein have the same meaning as those generally understood by a person of ordinary skill in the art to which the present invention belongs.

It should be noted that the terms used herein are only intended to describe specific implementations and not to limit the exemplary implementations of the present invention. As used herein, a singular form is intended to include a plural form unless otherwise indicated obviously in the context. Furthermore, it should be further understood that the terms "include", "includes" and/or "including" in this specification specify the presence of features, steps, operations, devices, components, and/or combinations thereof.

Explanation of the Terms

Convolution: an optical operation that performs a Fourier convolution on one or more modulated laser beams.

Cost-effectiveness: Neural network training and image comparison are performed through a single energy- and time-efficient optical operation.

Double convolution: a two-step optical Fourier convolution; first, a convolution is performed on one image when the modulated laser beam is recorded into one of the cells of a transparent holographic training matrix, and then an optical Fourier convolution is performed simultaneously with a set of Fourier images from transparent holographic training matrix and recording the result into one of the cells of the 3D holographic memory matrix.

Instantaneity: a long-term multi-step training operation of machine learning is replaced with a single Fourier convolution operation.

Full-analog: a method for performing the following operations: processing natural continuous signals in a neural network without prior sampling (digital) transform of the natural continuous signals; replacing multiple layers of traditional neural net with a single layer of the 3D holographic memory matrices; and implementing the training program by a single optical operation without using many steps (epochs) to adjust weights of connections of neuronal nodes, as is currently done, for example, in back-propagation.

Technical problems that can be solved by the present invention and corresponding improvements are as follows:

1. Modern full-analog optical neural networks necessarily add multiple layers of optical parts and redesign electronic components for parallel output, where the optical parts and the electronic components are required to have several blocks; the blocks are necessarily cascaded to solve the complex network structure for recognition tasks, and the recognition tasks are characterized by considering many parameters of many classes and thousands of the recognized objects.

According to the present invention, it is unnecessary to collect multiple layers of optical parts and re-designing electronic components for parallel output due to the double convolution and the 3D holographic memory. This memory includes all the required data on a single board in the form of a Fourier convolution memory matrix of the image set, where each matrix cell corresponds to a single category of images (for example, a category of happiness in emotion recognition).

2. An adaptive training method (with hundreds of periods, epochs, of training by, for example, stochastic gradient descent and back-propagation) for fine-tuning electronic analog computation by a full-analog optoelectronic chip may have limitations similar to those of digital neural networks, such as time consumption and sampling natural continuous signals.

The training process in the present invention is implemented by the instantaneous convolution of thousands of images of one category during one optical operation.

3. Modern optical systems use digital semiconductor electronic components and "write-once-read-many" memories. The operation of these components and "write-once-read-many" memories reminds digital information processing algorithms with a limited number of image recognitions, accompanied by a discrete signal spectrum distortion, which limits the growth of recognition accuracy. Such a system construction does not allow a reduction in the physical dimension of the system.

According to the present invention, it is unnecessary to transform continuous data into a digital form due to using a Fourier convolution of the image set and a "write-many-read-many" mode of the 3D holographic memory.

4. Modern methods for creating digital, quantum, and general-purpose optical artificial intelligence systems are based on implementing a digital algorithm with drawbacks such as high time and energy costs (several weeks and millions of dollars) for machine learning or much time for analog-to-digital conversion. Contexts of the modern digital Generative Pre-trained Transformer (GPT) model that may be used for image recognition are limited to ≈10,000 tokens. For example, in the case of emotion recognition, it can only help to recognize about ten discrete emotions. However, there may be thousands of emotions, with a continuous (fuzzy) range (bridge) among different emotions. Modern optical and digital tools cannot cover such a wide and continuous range of emotions.

The present invention does not have these limitations due to the use of the 3D holographic memory. The memory includes all the required data on a single board in the form of a matrix with thousands of Fourier convolution units (cells) of the image set, where each matrix cell corresponds to a single category of images.

5. Modern optical tools do not consider the subatomic level of the structure of human brain neurons, such as quantum phenomena that accompany the behavior of the mind and brain. Most quantum computers work only by processing the original digital information (pixels, bites, bits, Q-bits). A main drawback of a quantum method for creating an analog artificial intelligence system is a superposition of discrete (binary) representation of natural continuous data.

The present invention does not have these limitations, as data sampling, discretization, and digitization are not required in its design.

6. Modern digital or optical machine learning tools require a huge memory with a capacity exceeding a plurality of computing units (CUs). Thousands of CUs are necessarily connected in single or intergroup communication, which limits communication efficiency during neural network training and use. The application of optical tools currently can overcome this communication limitation; however, the problem of using time-cost analog-to-digital converters for intergroup communication still exists.

The present invention does not require the assembly of many groups of CUs due to using the 3D holographic memory. This memory includes all the required data on a single board in the form of the Fourier convolution matrix of the image sets.

7. Modern optical neural networks based on matrix multiplication have manufacturing limitations, resulting in limited scalability. It is very important to increase the size of the matrix and the dimensions (a depth, a width, the number of layers, and the number of neurons in a layer) of the neural network. The modern optical hardware only supports small matrices and a small number of neurons. To overcome these limitations, sampling operations are used before photonic computation, accompanied by inherent limitations in digital information processing mentioned above.

The present invention does not require sampling operations and matrix multiplication due to using the 3D holographic memory. The memory includes all the required data on a single board in the form of the Fourier convolution matrix of the image set.

Embodiment 1

Figure 1:
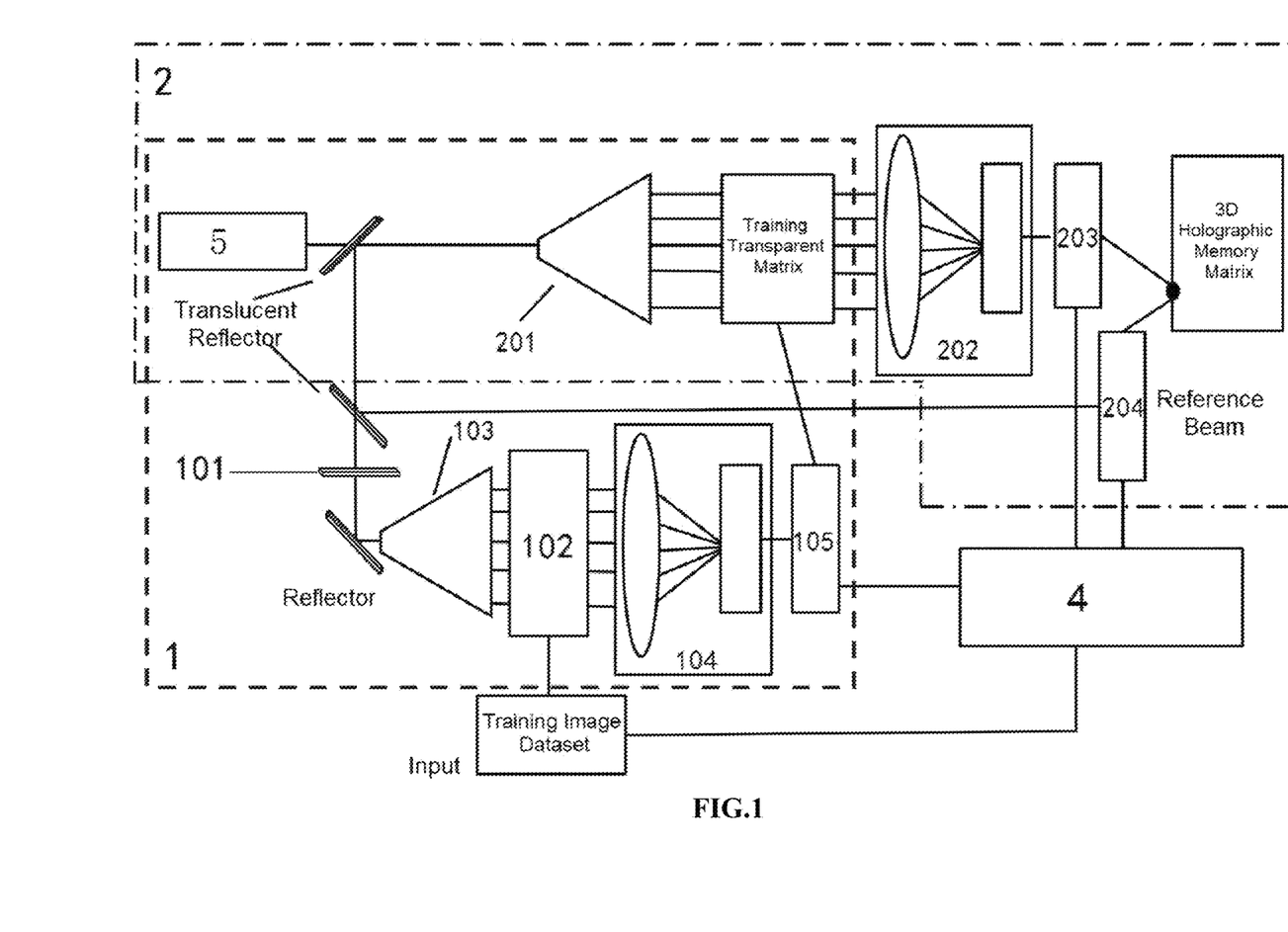
FIG. 1 is a structural schematic diagram of a first subsystem and a second subsystem according to an embodiment of the present invention.
Figure 2:
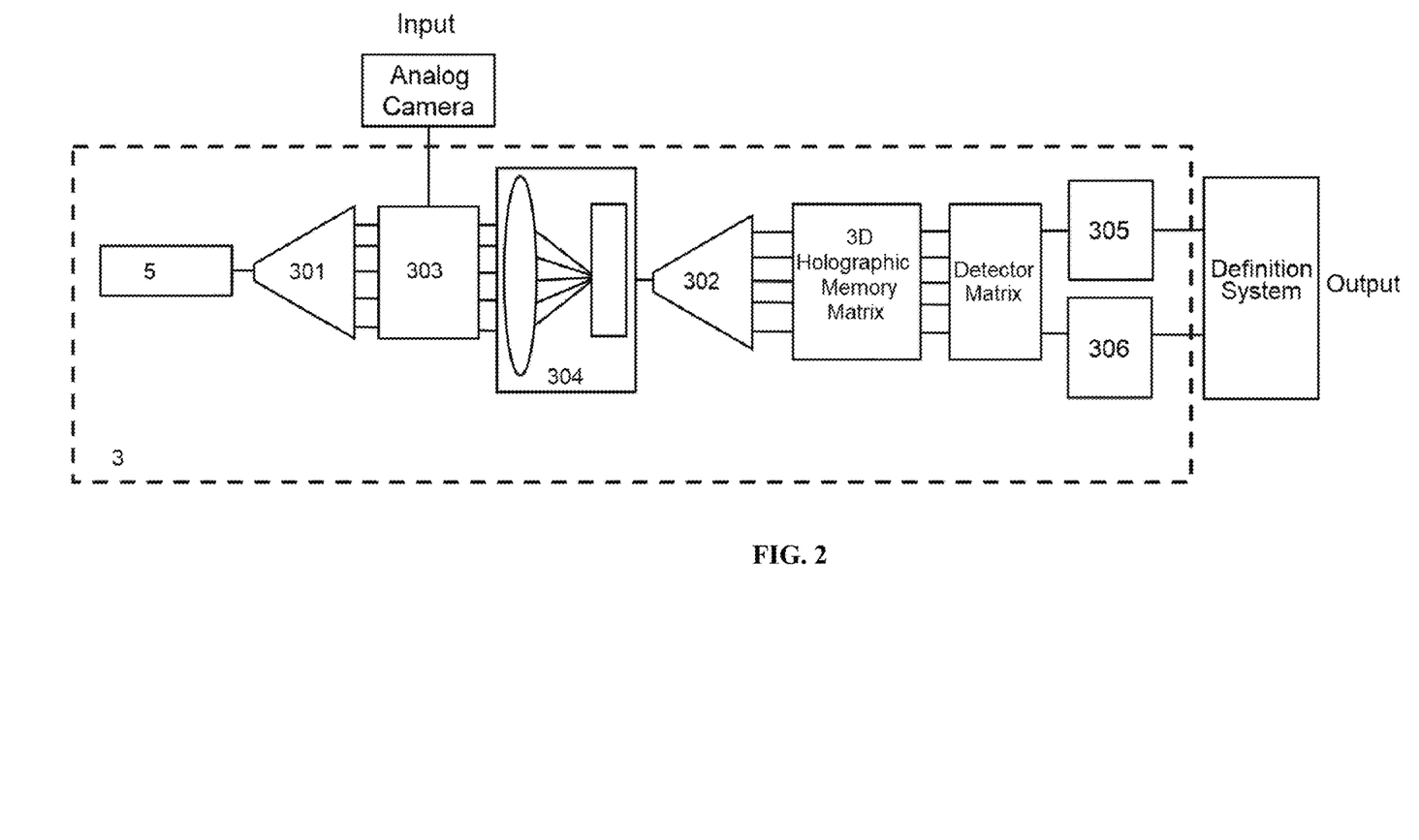
FIG. 2 is a structural schematic diagram of a third subsystem according to an embodiment of the present invention.

The present embodiment provides a device for image recognition based on the FAPNN, including the first subsystem 1, the second subsystem 2, the third subsystem 3, and the electronic digital controller 4, wherein the first subsystem, the second subsystem, and the third subsystem share one laser 5, and the second and the third subsystems include the 3D holographic memory matrix.

FIG. 1 shows the compositional architecture of the first subsystem and the second subsystem, and FIG. 2 shows the compositional architecture of the third subsystem.

As shown in FIG. 1, the first subsystem 1 includes the laser 5, two translucent reflectors, a reflector, a shutter 101, a spatial light modulator 102, a first beam expander 103, a second beam expander 201, a first optical block 104, training transparent holographic matrices, and a first deflector 105; a first end of the spatial light modulator 102 is connected to the shutter 101 through the first beam expander 103, a second end of the spatial light modulator is connected to the first optical block 104, a first end of the first optical block 104 is connected to a first end of the first deflector 105, and a second end of the first deflector 105 is connected to the electronic digital controller 4.

The first subsystem 1 is configured to create different training transparent holographic matrices corresponding to various discrete image categories; and the number of such matrices may be quite large (exceeding 30, up to a continuous scale). In the initial stage of system creation, the number of the generated training transparent holographic matrices corresponds to the number of the recorded categories of images. Each training matrix is recorded individually for a specific image category; and training matrices for recording different image categories may be changed mechanically and optically in sequence.

During the change of the optical training matrix, a rewritable 3D holographic storage device will be used in a further development stage of the system, and various images in the storage device will be recorded in a matrix form with different angles of the reference beam and the object beam, where one written matrix is used for one image category.

The second subsystem 2 further includes the laser 5, the second beam expander 201, a second optical block 202, a second deflector 203, a third deflector 204, the training transparent holographic matrices, and the 3D holographic memory matrix.

The first end of the second beam expander 201 is connected to the laser 5, a second end of the second beam expander is directed to the training transparent holographic matrices and then is directed to the second optical block 202 after the output of the training transparent holographic matrices, and the second optical block 202 is deflected by the second deflector 203 to the 3D holographic memory matrix; a first end of the third deflector 204 is directed to the 3D holographic memory matrix and a second end of the third deflector is connected to the laser 5 through the translucent reflector, and the third deflector is connected to the electronic digital controller 4.

The second subsystem generates different separate holographic cells on the 3D holographic memory matrix, with these holographic cells corresponding to various discrete image categories; the number of such cells may be quite large (exceeding 30, up to a continuous scale). In the initial stage of system creation, the number of formed cells corresponds to the number of recorded categories of images. Each cell for a specific image category is recorded individually by convolution of all images in the training transparent holographic matrix. At the same time, the training transparent holographic matrices for recording one of the cells of the 3D holographic memory matrix may be changed mechanically and optically in sequence. With the optical change in the training transparent holographic matrices, a rewritable 3D holographic memory device will be used, and various images at different cells of the 3D holographic memory matrix will be recorded with different angles of the reference beam and the object beam, where one training matrix is used for recording one image category.

The third subsystem 3 includes the laser 5, the analog camera, a third beam expander 301, a fourth beam expander 302, a second spatial light modulator 303, a third optical block 304 for Fourier convolution taking into account scaling, rotation, and phase factors, and focusing of the beam, the 3D holographic memory matrix, a detector matrix, the analog-to-digital converter 305, the electronic analog calculator 306, and a definition system, with an input end connected to the analog camera and an output end connected to the definition system.

The third subsystem 3 recognizes the images by values recorded at holographic cells in the 3D holographic memory matrix in the first subsystem 1 and the second subsystem 2, and the values correspond to various discrete image categories; and the number of such cells may be quite large (exceeding 30, up to a continuous scale). Image detection is performed in the third subsystem, so each image in the detector matrix is represented by a set of cells of the detector matrix with different intensities. All of the cells are displayed through the analog-to-digital converter and under the control of electronic analog computation, and may be used on a scale for a particular industrial system, that is, a definition system.

The electronic digital controller is configured to use a beam emitted by the laser and the training image dataset as inputs, control the first subsystem to create training transparent holographic matrices corresponding to various discrete image categories in the training image dataset;

using the beam emitted by the laser and an output of the first subsystem as inputs to the second subsystem, control the second subsystem to generate different separate holographic cells on the 3D holographic memory matrix, wherein the holographic cells corresponding to various discrete image categories; with an optical change in the training transparent holographic matrices, record the various image categories in different holographic cells of the 3D holographic memory matrix at different angles of a reference beam and an object beam.

The third subsystem is configured to receive an analog image of an image to be recognized, convert an image recognition result into an analog signal, and output the signal according to the image corresponding to the value of the holographic cell recorded in the 3D holographic memory matrix.

A workflow of the first subsystem is as follows:

the laser emits a laser beam pointing towards a translucent reflector, thereby forming two beams: object and reference; after the translucent reflector, the object beam is directed to the open shutter 101, and is reflected from a reflector; the reference beam is sent to the first beam expander 103, the object beam is directed by deflector to the spatial light modulator 102, and the spatial light modulator 102 receives another training image from the training image dataset related to images of the recorded categories;

after the spatial light modulator 102, the expanded beam is transformed by the first optical block 104 for the optical Fourier convolution taking into account scaling, rotation, and phase factors, and focusing of the beam and through an optical Fourier convolution operation, where the expanded beam is also concentrated into a narrow beam, and the narrow beam is directed to the first deflector 105 and arrives at a next cell in the training transparent holographic matrices from the first deflector 105.

After the translucent reflector, the reference beam is directed to the second beam expander 201, the second beam expander 201 splits the reference beam into beams with a quantity specified by the expander, parallel beams are directed to the training transparent holographic matrices, and in the training transparent holographic matrices, Fourier images are fixed in the form of a hologram.

After that, the operations described above are repeated for another image from the training image dataset block, and the electronic digital controller 4 is used to control the reception of the next image from the training image dataset, the deflector 105 and the open shutter 101 are used, until all training transparent holographic matrices corresponding to various discrete image categories in the image dataset are obtained.

A workflow of the second subsystem is as follows:

the shutter 101 of the first subsystem is closed, and the laser beam is directed towards the translucent reflector, forming two beams: object and reference. The object beam is directed to the second beam expander 201 after the translucent reflector, the expanded beam is directed to the recorded training transparent holographic matrix, then a set of parallel beams are directed to the second optical block 202 for the Fourier convolution with taking into account scaling, rotation, and phase factors, and focusing of the beam, a Fourier convolution of the image set modulated by the training transparent holographic matrices takes place in the optical block 202, then, these beams are focused into one beam carrying information about many Fourier images recorded in the training transparent holographic matrices, and then the beam is deflected to a certain cell in the 3D holographic memory matrix via the second deflector 203.

The reference beam is directed to another translucent reflector (which may be replaced with an opaque reflector), after the translucent reflector, the reference beam is directed from the reflector to a third deflector 204, and the third deflector 204 directs the reference beam to the same cell towards which the object beam cells as a result of two (if training transparent holographic matrices consist of Fourier images) Fourier transforms. Afterward, the described operations are repeated for other images recorded on other training transparent holographic matrix, the deflector 204 is used to record the next image on another cell of the 3D transparent holographic memory matrix, the shutter is controlled by the electronic digital controller, and the electronic digital controller is performed by a digital computer.

As shown in FIG. 2, the workflow of the third subsystem is as follows:

the laser 5 beam is directed to a third beam expander 301, then the expanded beam is directed to the second spatial light modulator 303, and the second spatial light modulator 303 receives an image from the analog camera for recognition.

After the modulator, the expanded beam is directed to the third optical block 304 for the Fourier convolution or two Fourier convolutions, if training transparent holographic matrices consisting of Fourier images, taking into account scaling, rotation, and phase factors, and focusing of the beam, where after Fourier convolution, the expanded beam is concentrated into a compressed beam, and then the beam enters the beam expander. Then the expanded beam is directed to the 3D holographic memory matrix in the form of parallel beams, where the number of beams is equal to the number of cells in the 3D holographic memory matrix. The resonant results of the modulated beam are read by the detector matrix, the detection results in a signal form with a plurality of cell brightness values in the 3D holographic memory matrix are displayed via the analog-to-digital converter 305 and under control of computation by the electronic analog calculator 306, and the results obtained according to the analog-to-digital converter 305 and the electronic analog calculator 306 are used on a scale for a particular industrial system, that is, a definition system.

Embodiment 2

Figure 3:
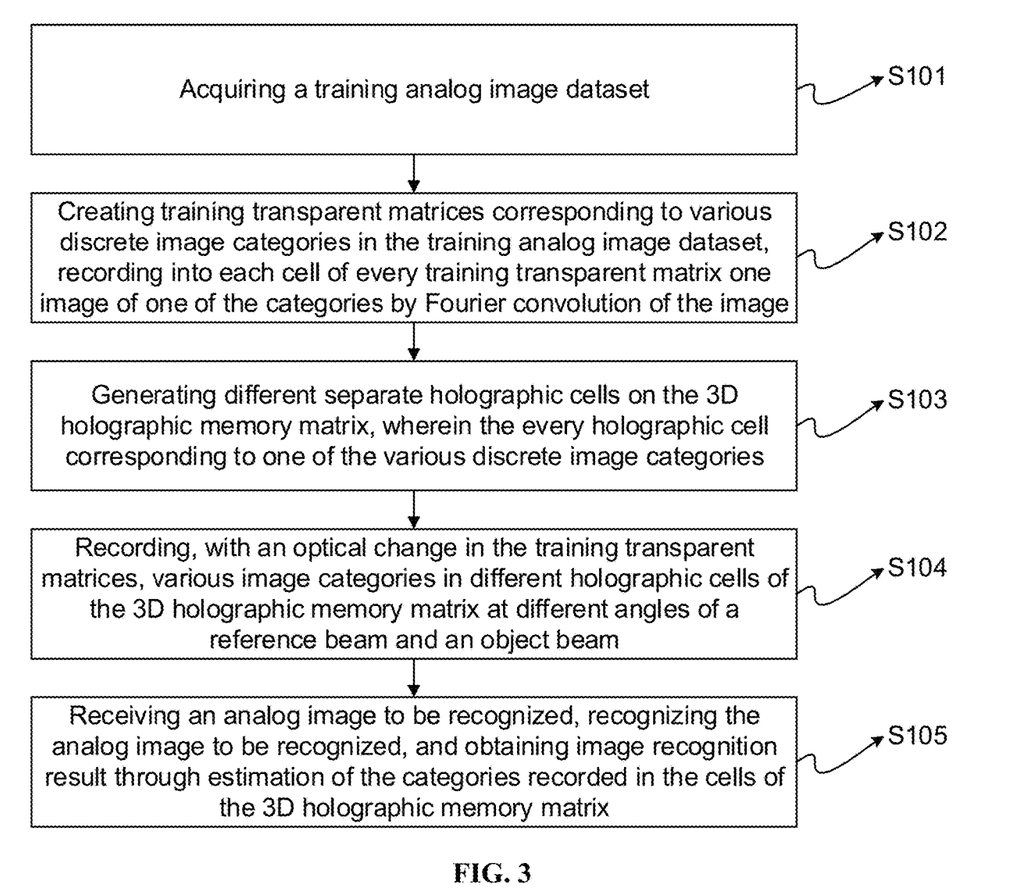
FIG. 3 is a flow chart of a method for image recognition based on FAPNN according to an embodiment of the present invention.

As shown in FIG. 3, the present embodiment provides a method for image recognition based on the FAPNN, using the device for image recognition based on the FAPNN described in Embodiment 1, including the following steps:

S101: acquiring a training analog image dataset;

S102: creating training transparent holographic matrices corresponding to various discrete image categories in the training image dataset, recording each cell for each image category by a convolution of every image in the training transparent holographic matrices (the training matrices can be made without the convolution) with taking into account scaling, rotation, and phase factors;

S103: generating different separate holographic cells on the 3D holographic memory matrix by simultaneously convolution all images of one of the training transparent holographic matrices with taking into account scaling, rotation, and phase factors, wherein the holographic cells correspond to various discrete image categories;

S104: recording, with a mechanical or optical change of the training transparent holographic matrices, the various image categories in different holographic cells of the 3D holographic memory matrix at different angles of the reference beam and the object beam; and S105: receiving an analog signal of an image to be recognized, convolving the received analog signal with taking into account scaling, rotation, and phase factors, recognizing the image to be recognized, and obtaining an image recognition result (it may be fuzzy) through detecting values of the holographic cells recorded in the 3D holographic memory matrix.

The number of the training transparent holographic matrices corresponds to the number of the recorded image categories, wherein each of the training transparent holographic matrices writes one image category; and the number of the holographic cells corresponds to the number of the recorded images, wherein the holographic cells corresponding to various discrete image values.

Further, in S102, the creation of training transparent holographic matrices corresponding to various discrete image categories in the training image dataset includes:

receiving the object beam and the training image dataset by the spatial light modulator, transforming the object beam emitted by the laser through an optical Fourier convolution operation by the first optical block, and directing the beam to the first deflector to direct into the next cell in the training transparent holographic matrices from the first deflector;

expanding and directing the reference beam emitted by the laser to the training transparent holographic matrices, fixing Fourier images in the training transparent holographic matrices in the form of holograms; and repeating the above operations for other images from the training image dataset block, until all training transparent holographic matrices corresponding to various discrete image categories in the image dataset are obtained.

Further, in S104, the recording of the various image categories in different holographic cells of the 3D holographic memory matrix at different angles of the reference beam and the object beam includes:

directing the expended object beam emitted by the laser to the recorded training transparent holographic matrices and passing it through the second optical block, making a Fourier convolution of the image set modulated in the training transparent holographic matrices occur in the second optical block, focusing the object beam into one beam carrying information about a plurality of Fourier images recorded in the training transparent holographic matrices, and then deflecting the beam by the second deflector to corresponding cells in the 3D holographic memory matrix, each cell corresponding to a single category of images; directing the reference beam emitted by the laser through the third deflector to the same cell towards which the object beam cells as a result of two Fourier transforms, and repeating the above operations for other images recorded on another training transparent holographic matrix, until all the training transparent holographic matrices are stored into the 3D holographic memory matrix.

In S104, the recording the various image categories in different holographic cells of the 3D holographic memory matrix at different angles of the reference beam and the object beam and with the optical change of the training transparent holographic matrices is specifically as follows: during the change of the optical matrix, using a rewritable 3D holographic storage device, and recording various images in the storage device in a matrix form and at different angles of the reference beam and the object beam.

TABLE 1

Comparison of performance between traditional methods and the present invention

| Method | Energy efficiency, speed/W | Speed (thousand trillions of operations per second) | Accuracy (%) | Number of image categories | Training difficulty |
| --- | --- | --- | --- | --- | --- |
| Digital, GPU* | 0.5 | 156 | 92 | 10 | Supercomputer hours or days |
| Optical ACCEL** | $7.48/10^4$ | $4.55/10^3$ | 92.6 | 3-5 | >10 training epochs |
| FAPNN (predicted) | $10^7$ | $10^6$ | >95 | >30, continuous (fuzzy) | Single operation, instantaneity |

As Table 1 shows, the predicted for the FAPNN number of image categories, energy efficiency, speed, and accuracy are superior to the traditional method.

Embodiment 3

The present embodiment provides a program product. The product is a computer program product, including computer programs for the electronic digital controller, where the computer programs, when executed by a processor, support the image recognition method based on the FAPNN as described in Embodiment 2.

The foregoing is merely illustrative of the preferred examples of the present invention and is not intended to limit the present invention, and various changes and modifications may be made by those skilled in the art. Any modifications, equivalent substitutions, improvements, and the like within the spirit and principles of the invention are intended to be included within the scope of the present invention.

The invention claimed is:

1. A device for image recognition based on a full-analog photonic neural network (FAPNN), comprising a first subsystem, a second subsystem, a third subsystem, and an electronic digital controller, wherein the first subsystem, the second subsystem, and the third subsystem share one laser and comprise an optical block for Fourier convolution with taking into account scaling, rotation, and phase factors, the first subsystem and the second subsystem share training transparent holographic matrices, and the second subsystem and the third subsystem share a three dimensional (3D) holographic memory matrix;

the electronic digital controller is configured to control, by using deflectors and a beam emitted by the laser and a training analog image dataset as inputs, the first subsystem to create the training transparent holographic matrices corresponding to various discrete image categories in the training analog image dataset; and control, by using the deflectors and the beam emitted by the laser and an output of the first subsystem as inputs to the second subsystem, the second subsystem to generate different separate holographic cells on the 3D holographic memory matrix, wherein the holographic cells corresponding to the various discrete image categories; and, record, with an optical change of the training transparent holographic matrices, the various image categories in different holographic cells of the 3D holographic memory matrix at different angles of a reference beam and an object beam;

the third subsystem is configured to receive an analog image to be recognized, convert an image recognition result into an analog signal, and output the signal according to the analog image to be recognized corresponding to the value of the holographic cell recorded in the 3D holographic memory matrix; wherein, a number of the training transparent holographic matrices corresponds to a number of the recorded categories of images, wherein each of the training transparent holographic matrices writing the images from one category of images; and a number of the holographic cells in one of the training transparent holographic matrices corresponds to the number of the recorded images of one category;

the first subsystem further comprises the laser, a open shutter, two translucent reflectors, a reflector, a spatial light modulator, a first beam expander, a second beam expander, a first optical block, the training transparent holographic matrices, and a first deflector; a first end of the spatial light modulator is connected to the laser, through the open shutter, the reflector, the two translucent reflectors, and the first beam expander, a second end of the spatial light modulator connected to the first optical block, a first end of the first optical block is connected to a first end of the first deflector, and a second end of the first deflector is connected to the electronic digital controller; wherein, the laser and the first beam expander can be replaced by a laser matrix; wherein, the controlling of the first subsystem to create the training transparent holographic matrices corresponding to the various discrete image categories in the training analog image dataset, specifically comprising:

receiving the object beam emitted by the laser and each image from the training analog image dataset by the spatial light modulator, transforming the object beam through an optical Fourier convolution operation by the first optical block, and directing the transformed beam to the first deflector to direct at a next cell of the training transparent holographic matrices from the first deflector; and expanding and directing the reference beam emitted by the laser to the training transparent holographic matrices, and fixing Fourier images in the cells of the training transparent holographic matrices in the form of a hologram;

the second subsystem further comprises the laser, the second beam expander, a second optical block, a second deflector, a third deflector, the training transparent holographic matrices, and the 3D holographic memory matrix; wherein, the laser and the second beam expander can be replaced by the laser matrix; wherein, a first end of the second beam expander is connected to the laser, a second end of the second expander is directed to the training transparent holographic matrices and then is directed to the second optical block after output of the training transparent holographic matrices, and after the second optical block the beams are directed by the second deflector to the cells of the 3D holographic memory matrix; a first end of the third deflector is directed to the 3D holographic memory matrix and a second end of the third deflector is connected to the laser through the two translucent reflectors and the third deflector is connected to the electronic digital controller; wherein, the recording of the various image categories in different holographic cells of the 3D holographic memory matrix at different angles of the reference beam and the object beam, comprising:

directing the object beam emitted by the laser to recorded training transparent holographic matrices and passing it through the second optical block, making simultaneously a Fourier convolution of an image set modulated in the training transparent holographic matrices occur in the second optical block, focusing the object beam into one beam carrying information about a plurality of Fourier images recorded in the training transparent holographic matrices, and then deflecting the beam by the second deflector to corresponding cells in the 3D holographic memory matrix, each cell corresponding to a single category of images;

directing the reference beam emitted by the laser through the third deflector to the same cell towards which the object beam pointing as a result of two Fourier transforms, and repeating the directing operations as the object beam for other images recorded on another training transparent holographic matrix, until all the training transparent holographic matrices are stored into the 3D holographic memory matrix; and the third subsystem further comprises the laser, a third beam expander, a fourth beam expander, an analog camera, an optical block, the 3D holographic memory matrix, a detector matrix, an analog-to-digital converter, and an electronic analog calculator, wherein the detector matrix has an input end connected to the 3D holographic memory matrix and an output end connected to the analog-to-digital converter and the electronic analog calculator; wherein, when the third subsystem performs the image recognition, each image in the detector matrix is represented by a set of cells with different intensities, and all the cells are displayed by the analog-to-digital converter and under control of computation by the electronic analog calculator; wherein, the laser and the third beam expander can be replaced by the laser matrix.

2. The method for image recognition based on the FAPNN, using the device for image recognition based on the FAPNN according to claim 1, comprising the steps:

acquiring the training analog image dataset;

creating the training transparent holographic matrices corresponding to various discrete image categories in the training analog image dataset, recording each cell for each image of one category by a convolution of every image in the training transparent holographic matrices;

generating different separate holographic cells on the 3D holographic memory matrix by simultaneously convoluting all images from one of the training transparent holographic matrices, wherein the holographic cells correspond to discrete images of one of the categories;

recording, with the optical change in the training transparent holographic matrices, the various image categories in different holographic cells of the 3D holographic memory matrix at different angles of the reference beam and the object beam; and receiving the analog image to be recognized, recognizing the analog image to be recognized, and obtaining the image recognition result through estimation of the values recorded in the holographic cells in the 3D holographic memory matrix.

3. The method for image recognition based on the FAPNN according to claim 2, wherein the recording, with the optical change in the training transparent holographic matrices, the various categories of images at the different holographic cells of the 3D holographic memory matrix at the different angles of the reference beam and the object beam is specifically as follows: during the optical change of the training transparent holographic matrices, using a rewritable 3D holographic storage device, and recording various images in the storage device in a matrix and the Fourie convolution form according to the different angles of the reference beam and the object beam.

* * * * *